Oct. 25, 1955   A. J. DREMEL   2,721,587
BENCH JIG SAW
Filed Dec. 1, 1953   3 Sheets-Sheet 1
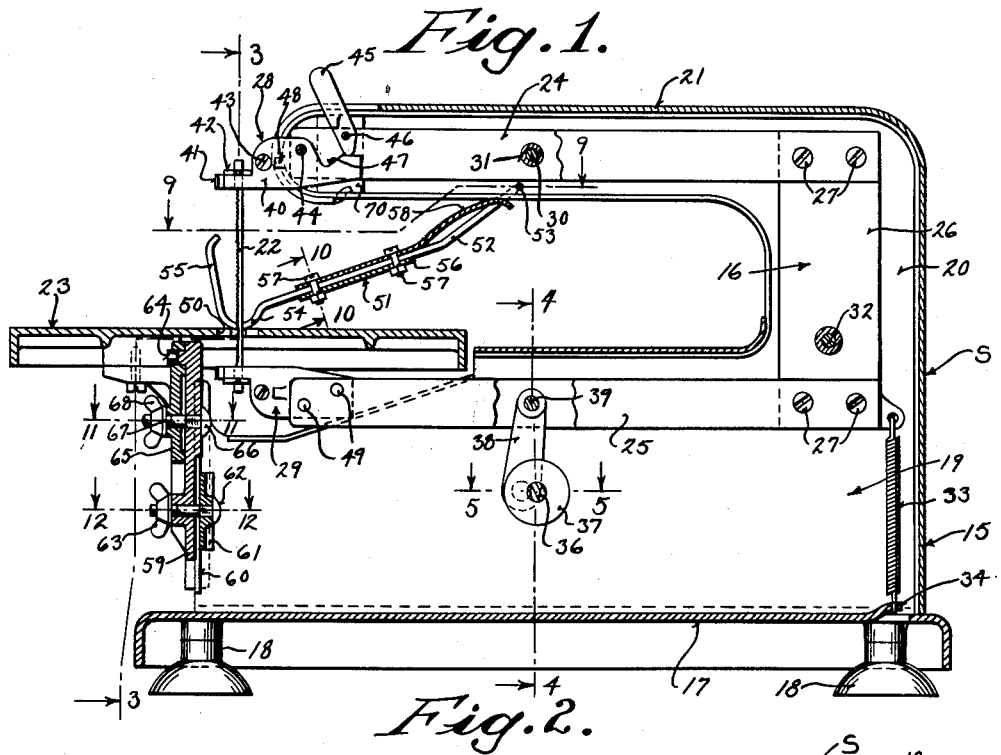
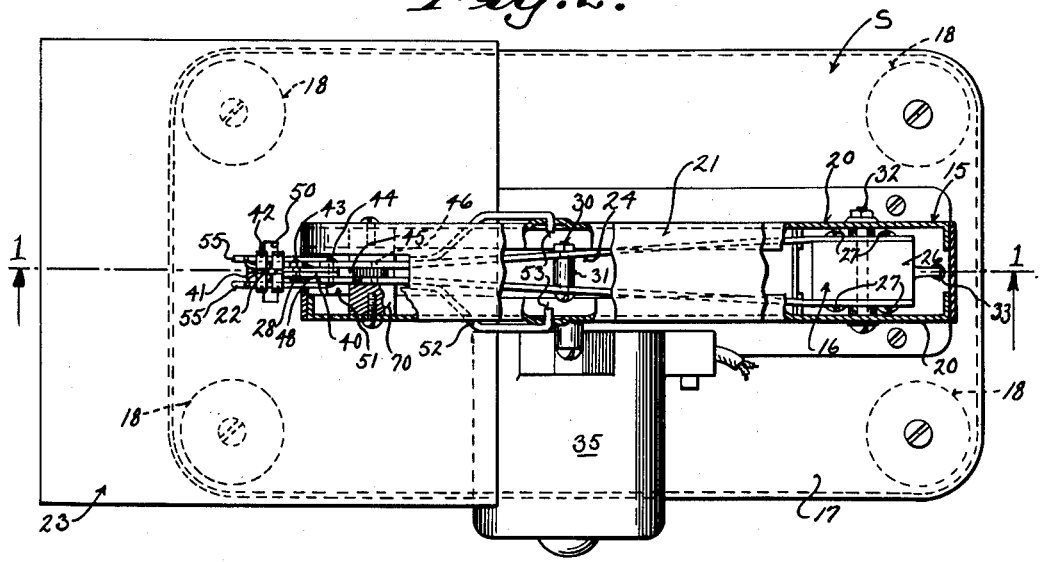
INVENTOR
ALBERT J. DREMEL
BY
*Manny and Wright*
ATTORNEYS Oct. 25, 1955     A. J. DREMEL     2,721,587
BENCH JIG SAW Filed Dec. 1, 1953                                    3 Sheets-Sheet 2

INVENTOR
ALBERT J. DREMEL

BY
*Monroe & Wright*
ATTORNEYS

Oct. 25, 1955　　　　　　A. J. DREMEL　　　　　　2,721,587
BENCH JIG SAW
Filed Dec. 1, 1953　　　　　　　　　　　　　　　3 Sheets-Sheet 3
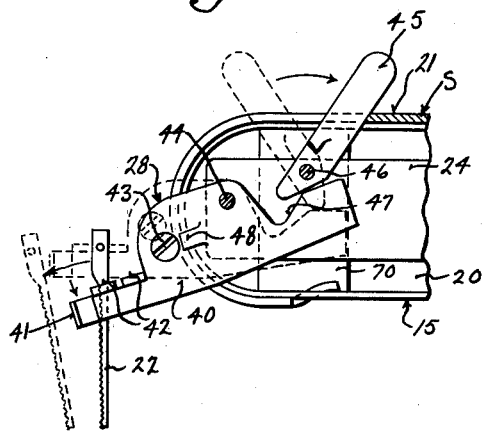
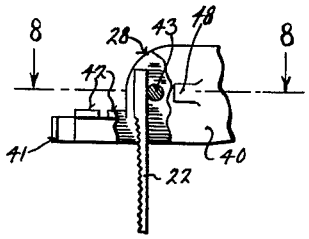
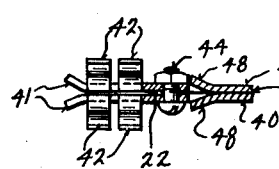
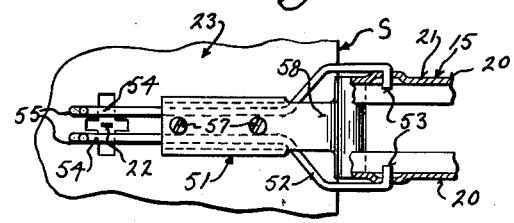
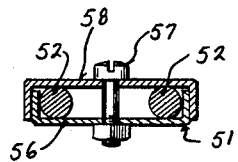
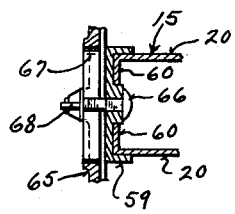
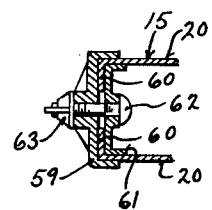
INVENTOR
ALBERT J. DREMEL
BY
ATTORNEYS

United States Patent Office 2,721,587
Patented Oct. 25, 1955

2,721,587
BENCH JIG SAW

Albert J. Dremel, Racine, Wis., assignor to Dremel Manufacturing Company, Racine, Wis., a corporation of Wisconsin Application December 1, 1953, Serial No. 395,350

3 Claims. (Cl. 143—71)

This invention appertains to scroll or jig saws particularly, but not necessarily, of the type useful in home workshops.

One of the primary objects of my invention is to provide, in a jig or scroll saw, novel means for releasably holding the saw blade in its frame, whereby the blade can be quickly and easily removed and replaced when necessary or desirable.

Another salient object of my invention is to provide a saw blade holder embodying blade terminal receiving members carried by the opposite ends of the frame, one of which is mounted for swinging movement toward and away from the other member, and a pivoted locking lever engaging the swingable receiving member for moving the same away from the other member and then again against movement for placing the saw blade under tension and for holding the blade in correct position in its frame.

A further object of the invention is to provide novel means for constructing the blade receiving members, whereby blades of different characters can be readily held.

Another further object of my invention is to provide a scroll or jig saw of the bench type in which the various parts are so formed and so related that a rugged but inexpensive structure will be had so that the same can be placed upon the market at a reasonable price for home use.

A further important object of my invention is the provision of a supporting table for the work associated in a novel manner with the front of the housing whereby adjustment of the table can be readily had both as to height and angle.

A still further object of the invention is the provision of a novel guard for the saw blade carried by the frame and bearing against said table with a desired tension and including novelly shaped guide legs straddling the saw blade and movable by the work on the table to a raised position and on the work whereby to aid in steadying the work during the manipulation thereof against the saw blade.

A still further important object of my invention is the provision of novel means for fabricating the saw frame for carrying the blade and for mounting the frame within the rigid housing and for guiding the frame during its rocking movement and for preventing lateral shifting of the frame adjacent to the saw blade, so that the saw blade during its reciprocation will be held steady in its proper sawing position.

With these and other objects in view, the invention consists in the novel construction, arrangement and formation of parts, as will be hereinafter more specifically described and claimed, and illustrated in the accompanying drawings, in which drawings, Figure 1 is a vertical longitudinal sectional view through a bench jig saw embodying the various features of the invention, the section being taken on the line 1—1 of Figure 2, looking in the direction of the arrows;

Figure 2 is a top plan view of the jig saw with parts of the housing or rigid frame broken away and in section to illustrate structural detail;

Figure 6 is an enlarged fragmentary detail vertical sectional view through the upper forward end of the housing or rigid frame illustrating the lock for releasably holding the saw blade in position on its frame or carrier, the view showing in full lines the released position for permitting the removal or replacing of a blade and the locked position of the holder in dotted lines;

Figure 7 is a fragmentary detail sectional view through the forward end of the upper saw blade holder illustrating the gripping of a blade of the type which is not provided with a holding pin;

Figure 8 is a detail fragmentary sectional view taken on the line 8—8 of Figure 7, looking in the direction of the arrows;

Figure 9 is a detail fragmentary horizontal sectional view taken on the line 9—9 of Figure 1, looking in the direction of the arrows, showing the novel guard for the saw blade in top plan;

Figure 10 is a detail transverse sectional view through the guard taken on the line 10—10 of Figure 1, looking in the direction of the arrows;

Figure 11 is a detail horizontal sectional view taken through the front portion of the lower part of the housing or rigid frame on the line 11—11 of Figure 1, and illustrating the adjustable connection of the table with the housing or rigid frame, and Figure 12 is a view similar to Figure 11, but taken on the line 12—12 of Figure 1, looking in the direction of the arrows.

Figure 3:
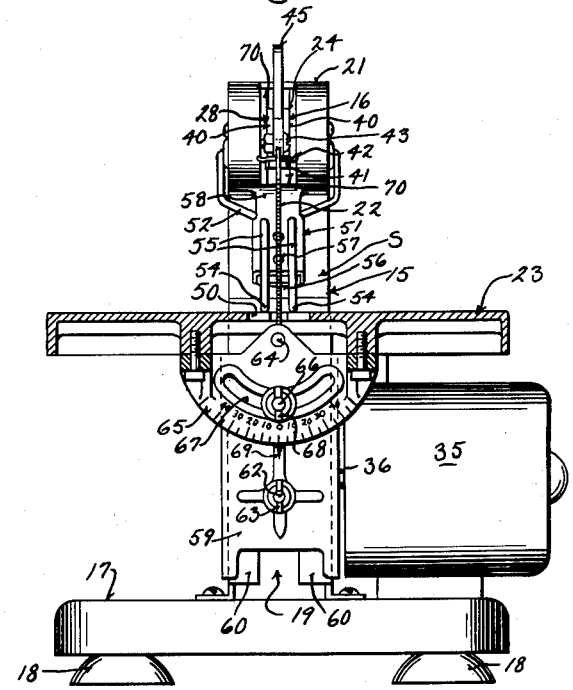
Figure 3 is a front elevational view of the jig saw with parts thereof in section, the parts in section being taken on the line 3—3 of Figure 1, looking in the direction of the arrows.
Figure 4:
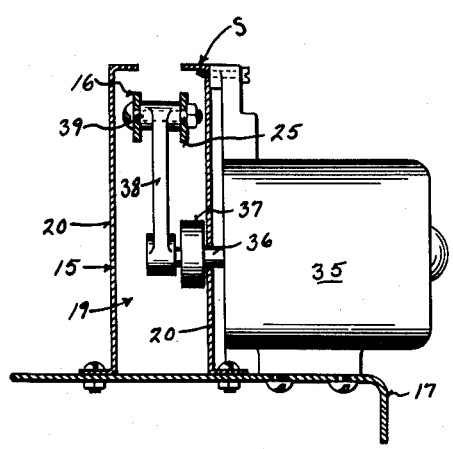
Figure 4 is a detail transverse sectional view taken on the line 4—4 of Figure 1, looking in the direction of the arrows and illustrating the drive for rocking the saw frame or carrier.
Figure 5:
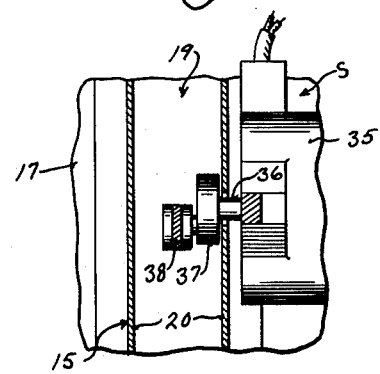
Figure 5 is a fragmentary detail horizontal sectional view on the line 5—5 of Figure 1, looking in the direction of the arrows, the figure also illustrating the drive for the saw frame.

Referring to the drawings in detail, wherein similar reference characters designate corresponding parts throughout the several views, the letter S generally indicates a jig saw embodying the novel features of my invention, and the same includes a housing or rigid frame 15 in which is mounted for rocking movement, the saw frame or carrier 16.

The housing or rigid frame 15 is of a C shape in side elevation and includes a flat base 17, preferably formed from a metal stamping. This base can carry any preferred type of attaching feet 18 for connection with a table or bench, and in the present instance, these feet have been shown to be of the suction type. The housing or rigid frame also includes a hollow main body portion 19 preferably fabricated from companion side walls 20 formed from metal stampings firmly secured to the base 17. This hollow body portion 19 carries a forwardly extending upper leg 21 which terminates as distance above the upper forward end of the body portion to provide a throat in which a saw blade 22 reciprocates and into which the work is fed. Below the leg 21 and defining a part of the throat is a work table 23 and this table and the mounting therefor will be hereinafter more fully described.

The saw frame or carrier 16 includes a top arm 24 which is housed within the upper leg 21, a lower spaced parallel arm 25, which is housed within the main portion of the hollow body 19, and a connecting back piece 26. By this construction, a U-shaped frame construction is provided. For the purpose of mounting and for receiving certain parts and for economy, the saw frame 16 is constructed in a certain novel manner. The connecting back piece 26 is preferably in the form of a solid bar, but the upper and lower arms 24 and 25 are formed from companion pieces of strap metal the rear ends of which straddle the back piece 26. These pieces are firmly united with the upper and lower ends of the back piece by suitable fastenings 27 or by welding. These pieces for the arms gradually converge toward their forward ends for embracing and receiving the upper and lower saw blade carrying members 28 and 29 which will be later described. The pieces of the upper arm 24 can be braced intermediate their ends by a bolt 30 and a spacer sleeve 31. This saw frame is rockably supported by a pivot or supporting shaft 32 which extends through the back piece 26, adjacent to its lower end and the terminals of the pivot or shaft are supported by the side walls 20 of the housing or rigid frame. To balance the saw frame, a contractile coil spring 33 is connected at its upper end to the rear lower corner of the saw frame and at its lower end to the base 17. The base can have struck up therefrom and disposed within the body portion of the housing an ear 34 for connection with the lower end of the spring.

To rock the saw frame, I preferably employ a small electric rotary motor 35, which is bolted or otherwise fastened to the body portion of the housing intermediate its ends directly above the base 17. The armature shaft 36 extends into the body portion of the housing and has connected therewith a crank wheel 37. Eccentrically connected to the crank wheel is a link 38 and this link, in turn, is rockably mounted on a pivot pin 39 carried by the side pieces of the lower arm 25. The upper end of the link is received between the side pieces and the link preferably terminates in a bearing sleeve for receiving the pivot pin and to act as a spacer for the side pieces of said lower arm.

One of the important features of my invention is the novel saw blade carriers 28 and 29, and particularly, emphasis is placed upon the upper saw blade carrier 28 which functions as a lock for the saw blade and these holders will now be described in detail.

The upper saw blade carrier or holding member 28 includes companion side plates 40 having formed on their lower ends forwardly projecting, outwardly flared fingers 41 and the upper edges of these fingers have formed thereon, laterally projecting slotted lips 42, Figs. 6 to 9. Adjacent to, but above the fingers 41, the plates 40 are secured together by a suitable nut and bolt 43, and the upper end of the saw blade 22 is sprung between the flared terminals of the fingers with the pin of the blade fitting over the lips. This upper carrier is received between the side pieces of the upper arm 24 of the saw frame and is mounted for swinging movement thereon by a pivot pin 44, whereby this upper carrier can swing toward and away from the lower carrier 29. A finger piece or lever 45 is rockably mounted on a pin 46 carried by the arm 24 above the carrier 28 and in rear of the pivot pin 44 and the lower end of this finger piece or lever 44 is provided with curved leading edges for engaging the upper edge of the carrier 28. Now, by referring to Figure 1, it can be seen that when the finger piece 44 is swung to the left, the lower end of the finger piece will bear firmly down on the upper edge of the carrier and swing the same on its pivot 44 to elevate the front end of the carrier, and thus place the saw blade 22 under tension. When the finger piece is swung to the right, the lower end of the finger piece moves away from the carrier and allows the front end of the carrier to swing down so that the blade can be easily released, Fig. 6. The upper edge of the carrier 28 can be notched, as at 47, to facilitate the raising of the rear end of the carrier 28 when the finger piece is moved to the right.

Struck out from the side pieces 40 are ears 48 and one of the ears engages the nut of the nut and bolt 43 to hold the nut against turning during the tightening of the pieces.

The saw blade 22 can be placed in a selected slot of the lips 42 when it is desired to reciprocate the saw blade transversely of the longitudinal axis of the table 23. Where saw blades are used that do not have laterally projecting terminal pins, the blade end can be firmly clamped between the side pieces 40 directly ahead of the nut and bolt 43, as best shown in Figures 7 and 8.

The lower blade carrier 29 is constructed similar to, or the same as, the upper blade carrier 28, and hence the same will not be described in further detail, but it is to be noted that this blade carrier 29 is rigidly connected to the forward end of the lower arm 25 of the saw frame 16 by means of rivets 49, or the like. At this point, it is to be noted that the table 23 is provided with a cross slot 50 through which the saw blade 22 reciprocates.

The work is fed by the operator over the table into engagement with the saw, and as the table has a smooth top, the work can be easily manipulated to cut the desired pattern therein. In order to prevent injury to the fingers of the operator, I provide a novel guard 51 for the saw blade and the guard is so constructed as to bear down on the work to facilitate the holding of the work steady on the table during the manipulation thereof. The saw guard 51 includes a pair of like, spaced parallel guard arms 52 preferably formed from stretches of stiff wire. The guard extends forwardly and downwardly from the upper portion 21 of the rigid housing or frame 15 toward the saw blade 22, with the guard arms extending on opposite sides of the saw blade. The rear ends of the guard arms 52 are provided with inturned pivot lugs 53 which are rockably received in pivot openings formed in the opposite sides of the upper portion 21 of the frame. The forward ends of the guard arms 52 have formed therein semi-circular shaped bearing feet 54 for engaging the work on the table and these guard arms then extend upwardly and forwardly in front of the saw forming the guard members 55. In feeding the work toward the saw, the work will engage the semi-circular feet 54 and due to the curvature of the feet, the work can be readily pushed under the guard into the saw. To add rigidity to the guard arms 52, and to hold the same in their spaced relation, a metal plate 56 is firmly clamped thereto by means of bolts 57. These bolts 57 also hold in place a leaf spring 58, the upper free end of which bears against the lower surface of the upper portion 21 of the frame for normally urging the feet 54 toward the table.

The table 23 is mounted in a novel manner on the forward end of the lower portion of the housing or rigid frame 15, so that various adjustments of the table can be had to push the work at the desired angle, etc. relative to the saw. This mounting for the table includes a vertically disposed bracket plate 59 which abuts firmly against the front face of the housing or rigid frame 15 and it can be seen, by referring to Figures 11 and 12 that the side frame stampings 20 have inturned flanges 60 which terminate in spaced relation. Engaging the inner face of the flanges 60 is a clamping plate 61 carrying a bolt 62 which extends between the flanges 60 and through the bracket plate 59. A winged nut 63 is threaded on the bolt 62 against the bracket plate, so as to firmly bring the bracket plate 59 and the clamping plate 61 into gripping contact with the flanges to hold the bracket plate in a desired adjusted position. The bracket plate can be provided with a boss for added rigidity to the bracket plate at the point where the bolt 62 passes therethrough. The front face of the bracket plate at its extreme upper end has formed thereon a pivot stud 64 on which is mounted for swinging movement a supporting bracket 65. This bracket 65 is rigidly secured to the under part of the table and forms the support for the table and by swinging the supporting bracket 65 on the pivot stud 64, the table can be moved to different angle positions relative to the horizontal. To hold the supporting plate and the table in a selected adjusted position, the bracket plate 59 carries a bolt 66 which extends through an arcuate slot 67 formed in the supporting bracket. The bolt 66 has threaded thereon a winged nut 68, which is adapted to be turned tight against the supporting bracket. If desired, the supporting bracket can be calibrated around the arcuate slot and the front face of the bracket plate 59 can be provided with an indicating arrow 69 (Fig. 3) to facilitate the reading of the calibrations. By adjusting the bracket 59 up and down, the table can be raised and lowered, and as stated, by adjusting the supporting bracket 65 on the stud 64, the table can be moved to different angles.

It is obvious that with a saw blade in position, and the circuit through the motor closed, that the saw will be bodily reciprocated and that the work can be easily fed into the same over the table. Great stress is laid on the means for releasably holding the blade in position and under tension, the novel guard for the saw blade and mounting for the table in combination with the housing construction.

To guide the saw frame in its movement and to more particularly hold the upper arm 24 of this frame against lateral shifting, I provide spaced wear blocks 70 (Figs. 1 and 2) for engaging the opposite faces of this arm 24 at a point adjacent to the extreme forward end thereof. These wear blocks 70 are rigidly secured to the inner faces of the side pieces of the upper leg or housing portion 21.

Changes in details may be made without departing from the spirit or the scope of this invention, but what I claim as new is:

1. In a jig saw of the bench type, a hollow housing including a lower main body portion and an upper hollow leg portion overlying the body portion and in spaced relation thereto defining a throat, a work table having a slot therethrough carried by the forward end of the body portion and underlying said upper leg portion, a U-shaped saw frame including upper and lower spaced parallel arms, means rockably mounting the saw frame on the housing, means for rapidly rocking the saw frame on its pivot, each of the arms of the saw frame including companion side pieces gradually converging toward their forward ends, a lower saw blade holder secured between said pieces of the lower arm, and a releasable saw blade holder disposed between and carried by the side pieces of the upper arm of the saw frame.

2. In a jig saw as defined in claim 1, said releasable saw holder being pivoted intermediate its ends, a locking lever pivotally mounted between the side pieces of the upper arm extending above and through the upper portion of the housing, the lower inner end of said lever having a rounded cam face for movement into and out of engagement with the releasable saw holder.

3. In a jig saw as defined in claim 1, and bearing guide blocks engaging the opposite sides of said upper arm adjacent to the blade holder carried thereby.

References Cited in the file of this patent

UNITED STATES PATENTS

| | | |
|---|---|---|
| 105,120 | Ogden | July 5, 1870 |
| 138,808 | Lawrence | May 13, 1873 |
| 189,461 | House | Apr. 10, 1877 |
| 578,826 | Luther | Mar. 16, 1897 |
| 912,593 | Miller | Feb. 16, 1909 |
| 1,175,582 | Bangert | Mar. 14, 1916 |
| 1,369,824 | McDonnell | Mar. 1, 1921 |
| 1,663,076 | Garner | Mar. 20, 1928 |
| 1,852,193 | Schneider | Apr. 5, 1932 |
| 1,964,651 | Tautz | June 26, 1934 |
| 2,646,089 | Gaskell | July 21, 1953 |
| 2,663,331 | Herder | Dec. 22, 1953 |

FOREIGN PATENTS

| | | |
|---|---|---|
| 187,525 | Great Britain | Oct. 26, 1922 |